US009627792B1

(12) United States Patent
Klein

(10) Patent No.: US 9,627,792 B1
(45) Date of Patent: Apr. 18, 2017

(54) POWER ADAPTER WITH RECESS

(71) Applicant: Western Digital Technologies, Inc., Irvine, CA (US)

(72) Inventor: Barry L. Klein, Trabuco Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 113 days.

(21) Appl. No.: 13/892,704

(22) Filed: May 13, 2013

Related U.S. Application Data

(60) Provisional application No. 61/814,755, filed on Apr. 22, 2013.

(51) Int. Cl.
*H01R 13/60* (2006.01)
*H01R 13/44* (2006.01)
*B65B 5/10* (2006.01)

(52) U.S. Cl.
CPC .............. *H01R 13/44* (2013.01); *B65B 5/10* (2013.01)

(58) Field of Classification Search
CPC ...... H01R 13/60; H01R 13/72; H01R 13/514; H01R 13/6392; H01R 24/76
USPC ......................................... 439/528, 501, 502
See application file for complete search history.

(56) References Cited

U.S. PATENT DOCUMENTS

| | | | | |
|---|---|---|---|---|
| 5,071,367 A | * | 12/1991 | Luu | H01R 13/72 191/12.4 |
| D375,483 S | * | 11/1996 | Tashiro | D13/110 |
| 5,691,882 A | * | 11/1997 | Ma | 361/679.32 |
| 5,934,473 A | * | 8/1999 | Belshe | 206/583 |
| 6,528,970 B1 | * | 3/2003 | Liu et al. | 320/107 |
| 6,894,457 B2 | * | 5/2005 | Germagian et al. | 320/119 |
| 7,245,515 B2 | * | 7/2007 | Chiang | 363/146 |
| 7,264,492 B2 | | 9/2007 | Liang | |
| 7,467,971 B2 | * | 12/2008 | Lin et al. | 439/501 |
| 7,554,828 B2 | * | 6/2009 | Wilson | 363/146 |
| 7,677,920 B2 | * | 3/2010 | Huang | H01R 13/72 439/501 |
| 7,713,073 B2 | | 5/2010 | Lin | |
| 7,746,029 B2 | * | 6/2010 | Toya | 320/107 |
| 8,043,122 B1 | * | 10/2011 | Cho | H01R 31/005 439/501 |
| 8,215,983 B2 | * | 7/2012 | Obata et al. | 439/528 |
| 2005/0112938 A1 | | 5/2005 | Liow et al. | |
| 2007/0126290 A1 | * | 6/2007 | Jaynes et al. | 307/150 |
| 2008/0266762 A1 | * | 10/2008 | Ho et al. | 361/679 |
| 2009/0227122 A1 | | 9/2009 | Jubelirer et al. | |
| 2010/0277007 A1 | | 11/2010 | Deluliis et al. | |
| 2011/0039435 A1 | | 2/2011 | Huang | |

* cited by examiner

*Primary Examiner* — Xuong Chung Trans

(57) ABSTRACT

According to one embodiment, a power adapter, comprises a power adapter body; a power circuit contained within the power adapter body; and a power cord terminated by a plug, the power cord being electrically connected to the power circuit and extending from the power adapter body. The power adapter body comprises a surface defining a recess that is configured to enable at least a portion of the plug to be removably received within the recess.

16 Claims, 4 Drawing Sheets

POWER ADAPTER WITH RECESS

CROSS REFERENCE TO RELATED APPLICATION

This application claims priority to U.S. Provisional Patent Application No. 61/814,755, filed Apr. 22, 2013, for "POWER ADAPTER", which is incorporated herein by reference in its entirety.

BACKGROUND

Over the years, power adapters have taken two forms—a power brick that requires a secondary AC cord, and a module (sometimes colloquially referred to as a "wallwart") that plugs directly into the AC receptacle on the wall or power strip.

The wallwart is a lower cost solution because the cost of the AC power cord is eliminated. One issue with wallwarts, however, is that the form factor thereof varies with manufacturer and output power requirements. Wallwarts can become quite large and their size may render other AC sockets on the wall or power strip inaccessible to other devices.

DETAILED DESCRIPTION

Figure 1:
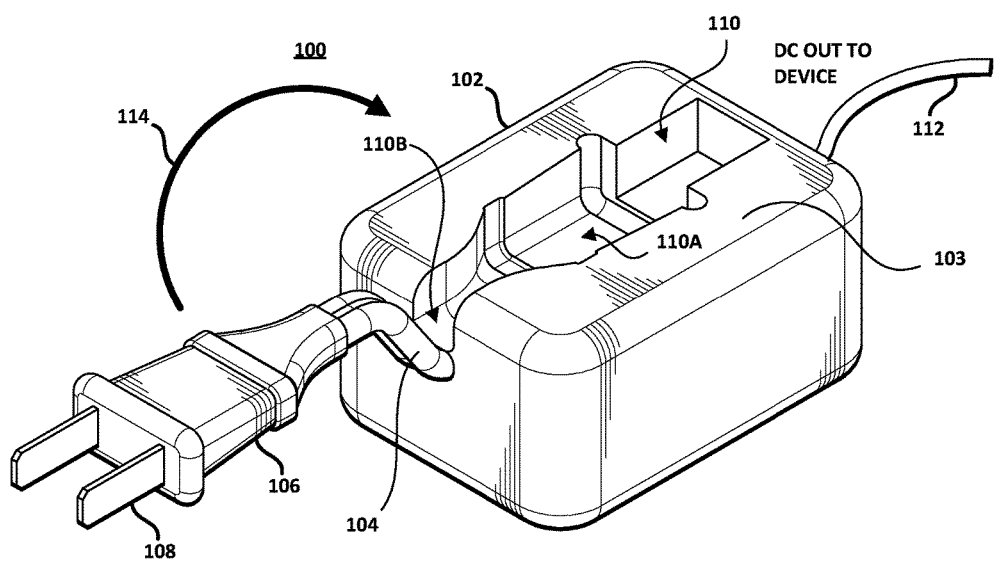
FIG. 1 is an isometric view of a power adapter in a first configuration, according to one embodiment.
Figure 2:
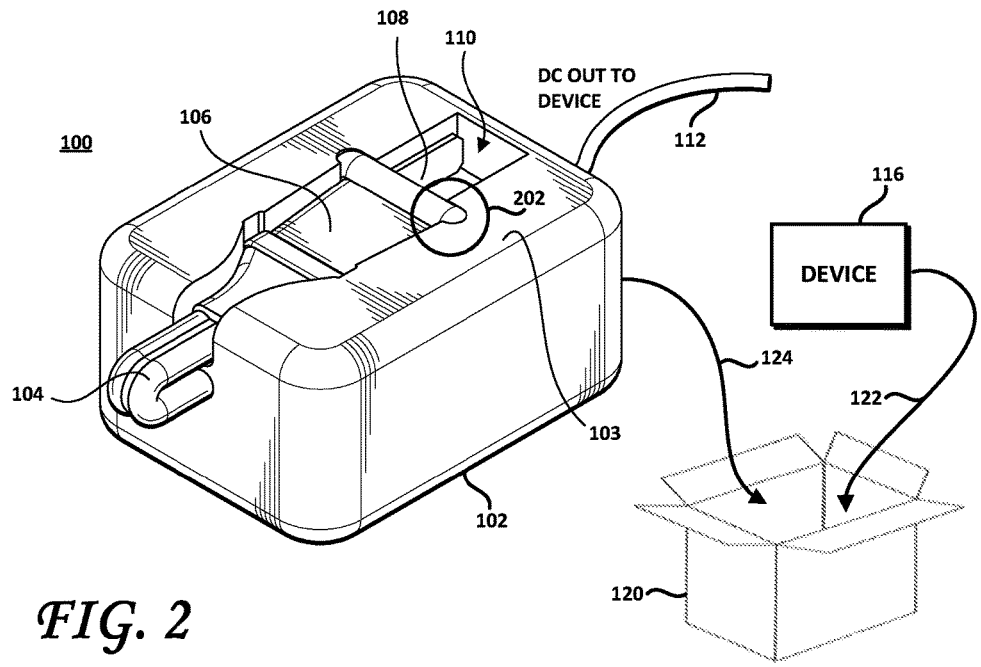
FIG. 2 is an isometric view of the power adapter of FIG. 1, in a second configuration.
Figure 3:
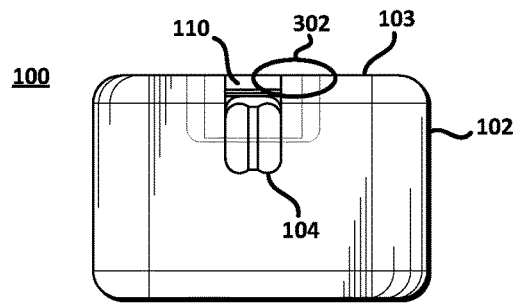
FIG. 3 is a front view of a power adapter according to one embodiment.
Figure 4:
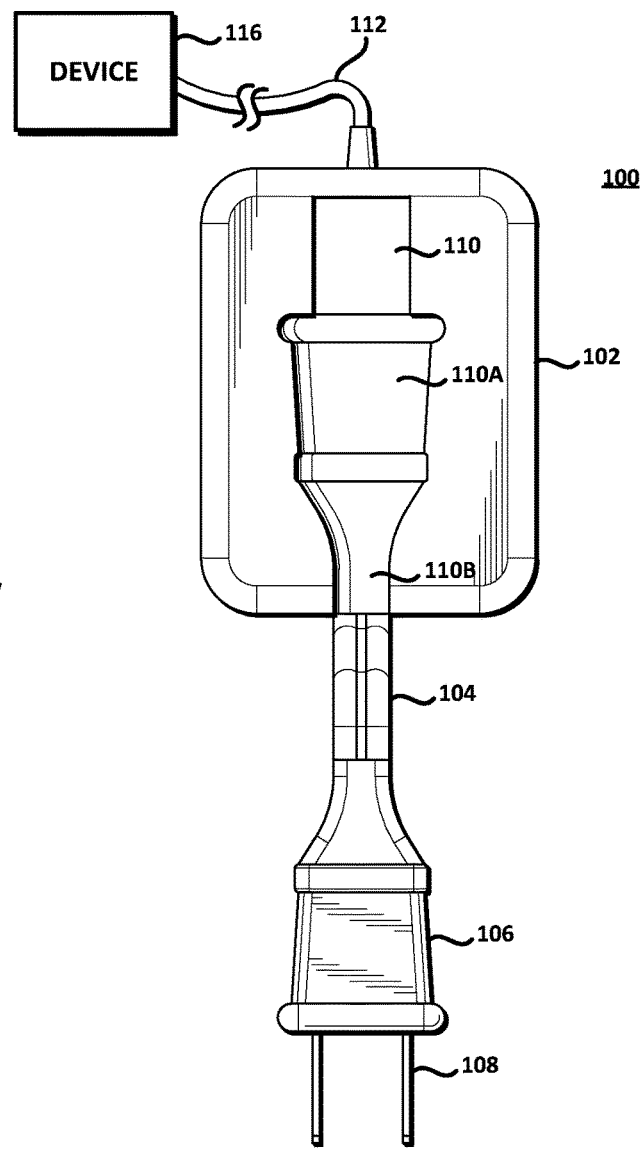
FIG. 4 is a top view of a power adapter according to one embodiment.
Figure 5:
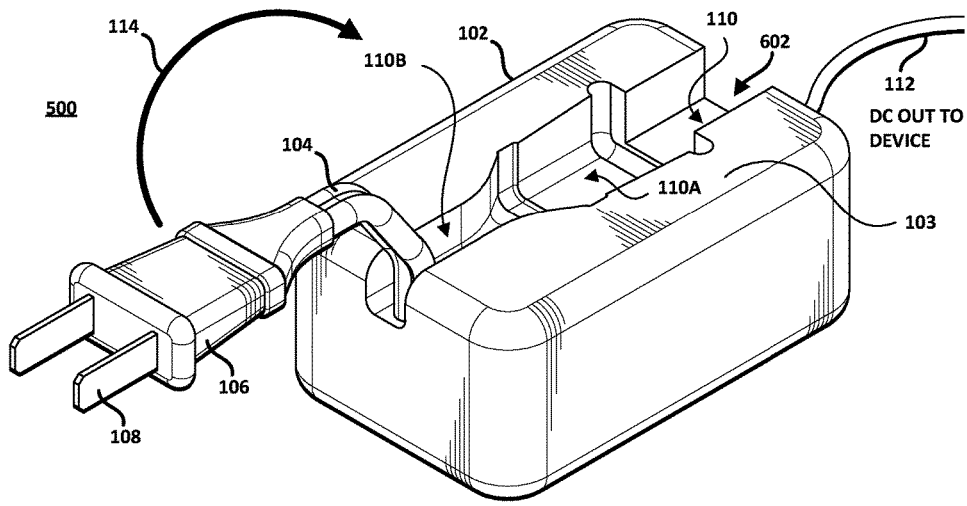
FIG. 5 is an isometric view of a power adapter in a first configuration, according to one embodiment.
Figure 6:
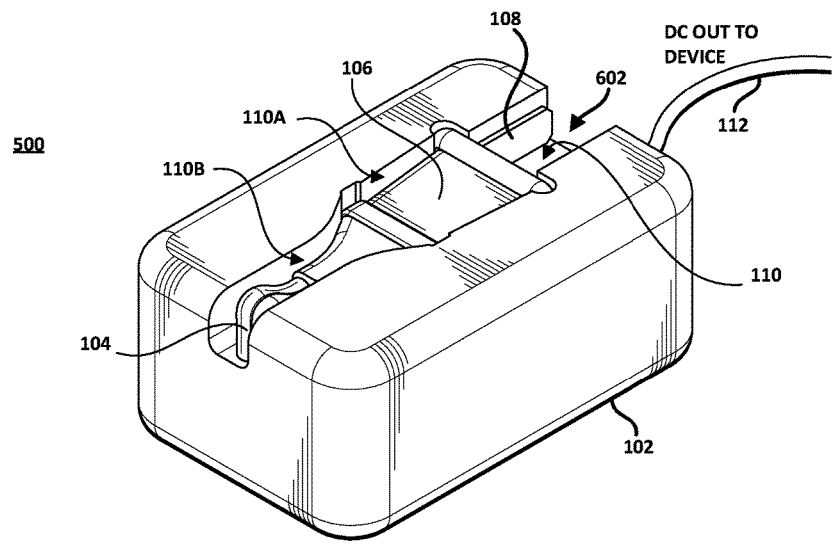
FIG. 6 is an isometric view of the power adapter of FIG. 5, in a second configuration.

FIGS. 1 and 2 are isometric views of a power adapter 100 in respective first and second configurations, according to one embodiment. FIG. 3 is a front view of a power adapter according to one embodiment and FIG. 4 is a top view of a power adapter according to one embodiment. Considering now FIGS. 1 through 4 collectively, the power adapter 100 may comprise a power adapter body 102. The power adapter body 102 may comprise an alternating current (AC) to direct current (DC) converter, configured to receive standard wall voltage (e.g., 100V to 240 V at 50 to 60 Hz) and to output a lower voltage, say 12V, 9V or 5V, for example, at a specified amperage. According to one embodiment, the AC-DC converter within the power adapter body 102 may receive the wall voltage through a standard, but short-length power cord 104, terminated by a plug 106. According to one embodiment, the plug 206 may comprise two prongs 108, as is common in the United States. The plug 206, however, may be configured differently for different power applications and for different countries. Indeed, other implementations are possible such as, for example, a plug 106 comprising one or three prongs or a plug 106 comprising differently-shaped prongs. For example, the 1998 Edition of "Electric Current Abroad," published by the U.S. Department of Commerce International Trade Administration and incorporated by reference herein in its entirety, describes plugs from Type A through Type L. Various embodiments of the power adapter 100 can be provided that are configured to secure the various types of plugs. As shown in FIGS. 1 and 2, a DC power cord 112 may be coupled to the power adapter body 102 and electrically connected to the output side of the AC-DC converter housed within the power adapter body 102. The DC power cord 112 may also comprise a distal-end connector (not shown), configured to plug into a device 116 (shown in FIG. 4) such as, for example, an external data storage device, a computing device and/or a rechargeable mobile device.

As shown, the power adapter body 102 may comprise a surface or surfaces that define a recess 110. The recess 110 may, according to one embodiment, be shaped so as to accommodate at least the plug 106 therein. According to one embodiment, the recess 110 may also be shaped, dimensioned and configured to accommodate at least a portion of the short AC cord 104. That is, the power adapter 100 may be configured to enable the AC cord 104 to be folded back towards the power adapter body 102, as suggested at 114, and at least the plug 106 fitted within the recess 110, such that the power adapter 100 transitions from the first configuration of FIG. 1 to the second configuration of FIG. 2. A portion of the AC cord 104 may also be accommodated within the recess 110.

As shown in FIGS. 1-7, the recess 110 may comprise a first portion, labeled 110A, configured to accommodate at least a portion of the plug 106 therein. The recess 110 may also comprise a second portion, labeled 110B, configured to accommodate at least a portion of the AC cord 104 therein. According to one embodiment, the recess 110 may be configured such that, when plug 106, 706 and AC cord 104 are pushed therein (with a user's thumb, for example), the top surfaces of the plug 106, 706 and of the AC cord 104 are either flush with the top-most surface 103 of the power adapter body 102 as shown at 202 in FIG. 2 or slightly recessed relative to the top-most surface 103, as best shown at 302 in FIG. 3. The shape of the recess 110 within the power adapter body 102 may be configured such as to retain the plug 106, 706 and optionally at least a portion of the AC cord 104 therein through, for example, an interference fit or a slight lip on the peripheral edges of the recess 110, yet enable easy removal of the plug 106, 706 and AC cord 104 from the recess 110, using the user's fingers, for example. The power adapter body 102, 702 may be configured to surround the plug 106 such as shown at FIGS. 1-4 or the recess 110 may be configured to enable open access to the plug 106, 706 and the prongs 108, 708 thereof, as shown FIGS. 5-7 at reference 602.

The recess 110 may be configured such that at least a portion of the prongs 108, 708 protrude from the footprint of the power adapter body 102, 702 when the plug 106, 706 is fitted in the recess 110. However, according to one embodiment and as shown in FIGS. 1, 2 and 4-7, the recess 110 may be configured such that the plug 106, 706 and its prongs 108, 708 do not protrude from the footprint of the power adapter body 102, 702 when the plug 106, 706 is fitted in the recess 110. That is, the recess 110 may be configured such that it receives the entire plug 106, 706 within its boundaries.

According to one embodiment, at least a portion of the AC cord 104 and the plug 106, 706 may be fitted within the recess 110 during shipment of the power adapter 100, 500, 700 and/or during storage thereof, to reduce the space taken up by the power adapter 100, 500, 700 and for ease of packing. The power adapter 100, 500, 700 may be shipped together with the device (e.g., data storage device, computing device, rechargeable mobile device, etc.) for which the power adapter 100, 500, 700 is intended and may be configured with the at least the plug 106, 706 (and, according to one embodiment, at least a portion of the AC cord 104) received and fitted within the recess 110 during shipment.

Although the figures show the AC cord 104 extending from one of the short sides of the power adapter body 102, 702 it may, according to one embodiment, be configured to extend from any other surface thereof, such as from one of the long sides of the power adapter body 102, 702 for example.

Figure 7:
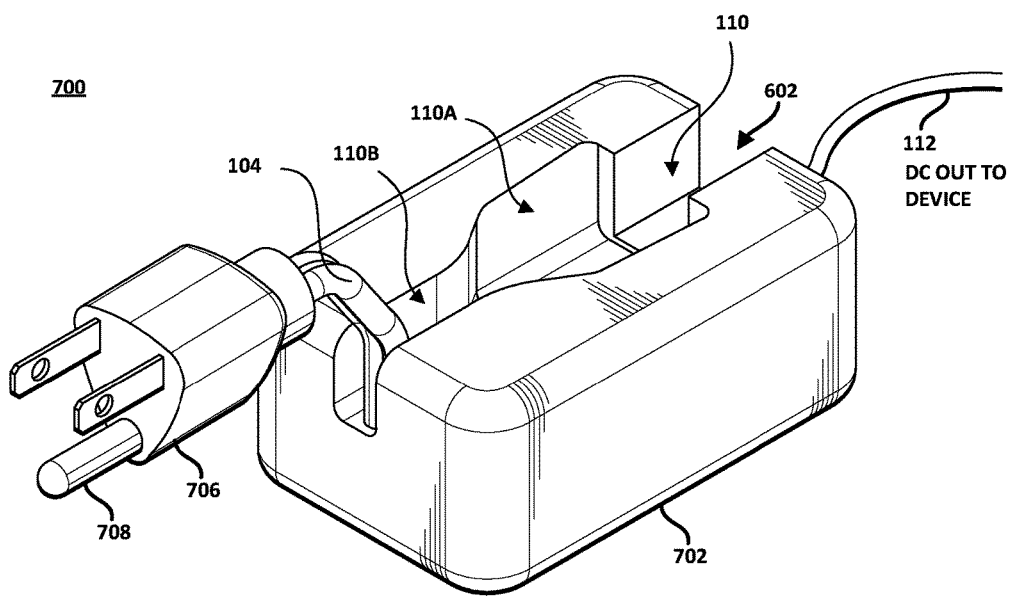
FIG. 7 is an isometric view of a power adapter, according to one embodiment.

As suggested in FIG. 7, the plug 706 need not only comprise two prongs. For example, one embodiment of a power adapter comprises a plug 706 comprising three prongs 708 to accommodate, for example, a ground connection. Other shapes and configurations of plugs are possible and the recess 110 within the body 102, 702 of the power adapter may be configured to fit most any shape of plug and AC cord.

Advantageously, when at least the plug 106, 706 is fitted within recess 110, the power adapter 100, 500, 700 is easy to ship, takes little space and does not, in use, occupy more real estate at a wall or power strip socket than would a single power cord and plug.

One embodiment is a method of packing an electrical device for shipment. Such a method, described herein relative to the power adapter 100 of FIGS. 1-4, may comprise placing the electrical device (data storage device, rechargeable mobile device, computing device and the like) in a box as suggested at 122 in FIG. 2, such as the cardboard box shown at 120 in FIG. 2. The box 120 may comprise molded spacer/shock absorbing materials, as is known. A power adapter configured as shown in FIGS. 1-7 may then be provided. That is, a power adapter configured to provide power to the electrical device may be provided, such that the power adapter comprises a power adapter body, a power circuit contained within the power adapter body and a power cord terminated by a plug, the power cord being electrically connected to the power circuit and extending from the power adapter body. As described above and shown in the figures, the power adapter body may comprise one or more surfaces that define or collectively define a recess configured to enable at least a portion of the plug to be removably received within the recess. The method may further comprise ensuring that at least the plug is received within the recess defined in the power adapter body. If at least the plug is not so received, the packer (whether human or robotic) may push at least the plug (and optionally at least part of the AC cord) into the recess defined in the body of the power adapter. After having ensured that at least the plug is received in the body of the power adapter, the power adapter with at least the plug being received within the recess may then be placed in the box, as suggested at 124 in FIG. 2. The box may then be closed. Because at least part of the plug is received within the body of the power adapter, the box 120 may be smaller than would otherwise be possible and packing may be easier than it otherwise would be. Moreover, as the AC cord 104 can be short and, in one embodiment, at least partially received within the recess defined within the body of the power adapter, the AC cord 104 need not be coiled and secured using one or more twist-ties or other fasteners, as is common practice. As such twist ties are no longer needed, embodiments save both time and material resources.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A power adapter, comprising:
   a power adapter body;
   a power circuit contained within the power adapter body; and
   a power cord terminated by a plug, the power cord being electrically connected to the power circuit and extending away from the power adapter body,
   wherein the power adapter body comprises a surface defining a recess configured to enable the plug to be removably received within the recess and to enable a portion of the power cord extending away from the power adapter body to be folded back on itself and to protrude from the power adapter body and also to be removably received within the recess such that the received plug and the received portion of the power cord do not protrude from the power adapter body, and
   wherein as the portion of the power cord is folded back on itself and the plug removably received within the recess, a first segment of the power cord initially located a first distance along the power cord from the power adapter body is caused to face a second segment of the power cord located at a second distance along the power cord from the power adapter body, the second distance being smaller than the first distance.

2. The power adapter of claim 1, wherein the plug comprises prongs and wherein the recess is further configured such that the prongs do not protrude from a footprint of the power adapter body when the plug is removably received within the recess.

3. The power adapter of claim 1, wherein the power cord is a direct current (DC) power cord.

4. The power adapter of claim 1, wherein the power cord is an alternating current (AC) power cord.

5. The power adapter of claim 4, further comprising a direct current (DC) power cord that is electrically coupled to the power circuit and that extends from the power adapter body.

6. The power adapter of claim 1, wherein the recess is further configured to retain at least the plug through interference fit.

7. A method of packing an electrical device for shipment, comprising:

placing the electrical device in a box;

providing a power adapter configured to provide power to the electrical device, the power adapter comprising a power adapter body, a power circuit contained within the power adapter body, and a power cord terminated by a plug, the power cord being electrically connected to the power circuit and extending from the power adapter body, the power adapter body comprising a surface defining a recess configured to enable the plug to be removably received within the recess and to enable a portion of the power cord extending away from the power adapter body to be folded back on itself and to protrude from the power adapter body and also to be removably received within the recess such that the received plug and the received portion of the power cord do not protrude from the power adapter body, such that as the portion of the power cord is folded back on itself and the plug removably received within the recess, a first segment of the power cord initially located a first distance along the power cord from the power adapter body is caused to face a second segment of the power cord located at a second distance along the power cord from the power adapter body, the second distance being smaller than the first distance;

ensuring that at least the plug is received within the recess;

placing the power adapter with at least the plug being received within the recess in the box; and closing the box.

8. The method of claim 7, wherein the plug comprises prongs and the recess is further configured such that the prongs do not protrude from a footprint of the power adapter body when the plug is removably received within the recess.

9. The method of claim 7, wherein the power cord is a direct current (DC) power cord.

10. The method of claim 7, wherein the power cord is an alternating current (AC) power cord.

11. The method of claim 7, wherein the power adapter further comprises a direct current (DC) power cord that is electrically coupled to the power circuit and that extends from the power adapter body.

12. The method of claim 7, wherein the recess is further configured to retain at least the plug through interference fit.

13. The method of claim 7, wherein ensuring comprises fitting at least the plug within the recess if the plug is not already fitted therein.

14. A power adapter, comprising:

a power adapter body; and a power cord extending from the body and terminating in a plug, wherein the power adapter body comprises a power cord and plug-shaped recess configured to enable the plug to be removably received within the recess and to enable a portion of the power cord extending away from the power adapter body to be folded back on itself and to protrude from the power adapter body and also to be removably received within the recess such that the received plug and the received portion of the power cord do not protrude from the power adapter body, wherein as the portion of the power cord is folded back on itself and the plug removably received within the recess, a first segment of the power cord initially located a first distance along the power cord from the power adapter body is caused to face a second segment of the power cord located at a second distance along the power cord from the power adapter body, the second distance being smaller than the first distance.

15. The power adapter of claim 14, wherein the power cord is an alternating current (AC) power cord.

16. The power adapter of claim 14, wherein the received plug is flush with a surface of the power adapter body or recessed within the power cord and plug-shaped recess.

* * * * *